Aug. 18, 1959      M. HATTAN      2,899,844
ROTARY TRANSMISSIONS
Filed April 1, 1957
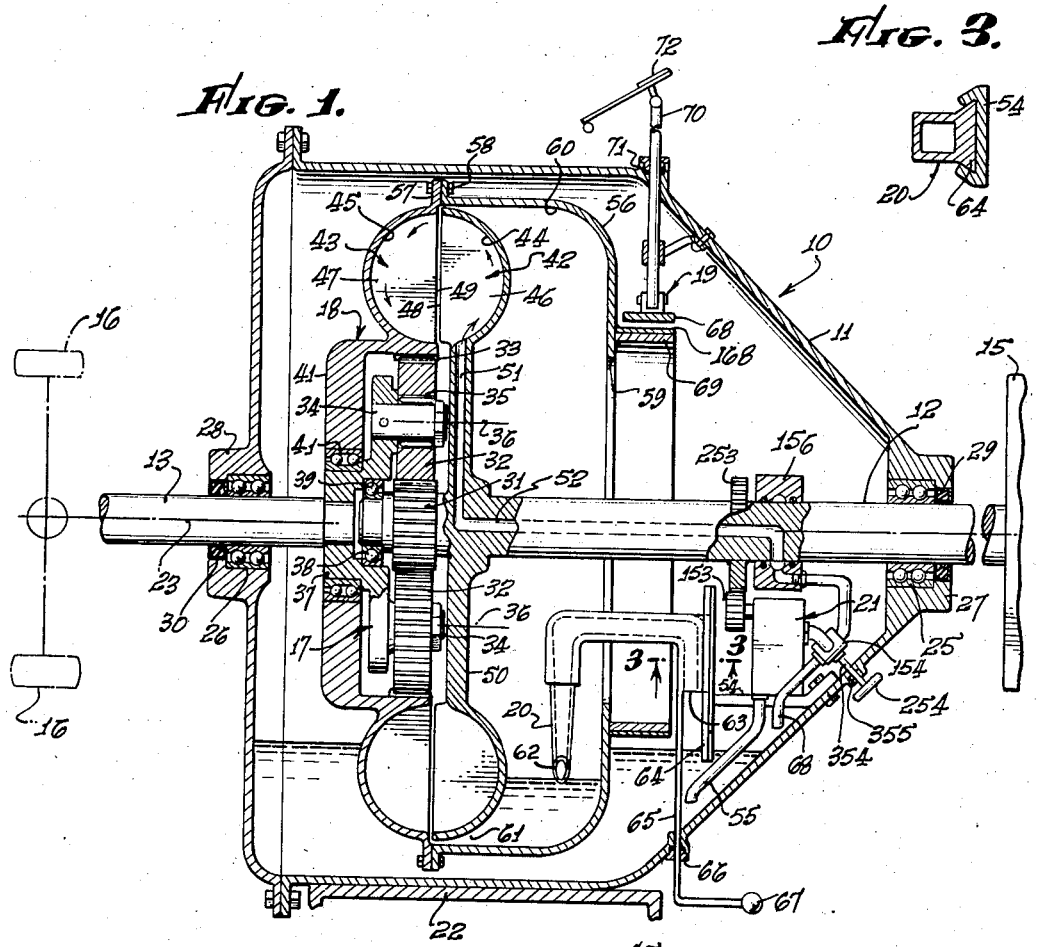
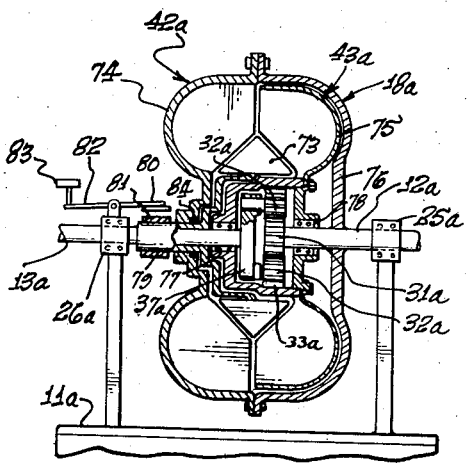
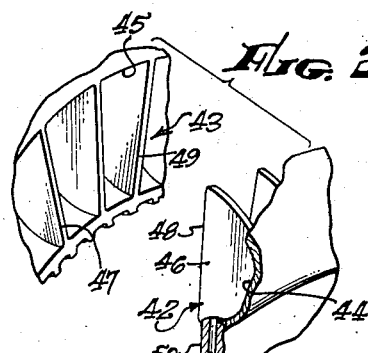
MARK HATTAN, INVENTOR.
By William P. Green
ATTORNEY.

United States Patent Office 2,899,844
Patented Aug. 18, 1959

2,899,844

ROTARY TRANSMISSIONS

Mark Hattan, Pasadena, Calif., assignor of one-fourth to William P. Green, Los Angeles, Calif.

Application April 1, 1957, Serial No. 649,697

12 Claims. (Cl. 74—688)

This invention relates to improved rotary power transmissions, which are partially of the hydraulic type in which a body of liquid is used for transmitting power between two rotary elements.

The general object of the invention is to provide an improved transmission which is capable of being very smoothly and easily converted between different torque ratio conditions, and which can be designed for automatic conversion to those conditions to thus function as an automatic transmission for automobiles and the like. At the same time, this transmission eliminates the necessity for the relatively complex and expensive structures which have been required in conventional hydraulic torque converters and other types of automatic transmissions. A transmission constructed in accordance with the invention is extremely simple and easy to manufacture, and yet is very rugged and reliable in use, as well as very versatile for use under numerous types of different situations.

Structurally, a transmission embodying the invention includes a planetary gear assembly and a fluid transmission mechanism, which are interrelated and used together in a novel manner such that the overall operation of the combination of units will allow for the desired variable ratio between input and output torque. This overall variable torque ratio may be attained even though the hydraulic portion of the apparatus may be a simple hydraulic "coupling" or "fluid drive," rather than the more complex hydraulic torque converter type of device. Also, even though a simple hydraulic coupling is used as the fluid portion of the apparatus, which coupling can only operate at a 1 to 1 torque ratio, the maximum overall ratio of the apparatus may be far in excess of this 1 to 1 figure. The use of a fluid coupling rather than a hydraulic torque converter is of course highly desirable by reason of the high efficiency and structural simplicity which is inherent in a fluid coupling. On the other hand, if it is desired in some instances to maximize the possible torque ratio at the expense of some loss in efficiency, a torque converter may be utilized in combination with the planetary gear assembly, to thereby add the built-in torque conversion capacity of the torque converter to the effect attained by the overall relationship between the gears and the fluid transmission.

To define the gear-fluid transmission relationship more specifically, the planetary gear assembly of course includes two main gears turning about a common axis, normally a small diameter "sun" gear and a larger diameter "ring" gear, together with a planet gear which meshes with the first two gears and turns about a second and revolving axis. The drive connection to the transmission drives one of the two main gears (preferably the sun gear) and also drives the pump half of the fluid transmission with that gear. The turbine half of the fluid transmission drives the second main gear (preferably the ring gear). The power output shaft or element is driven by and in accordance with the revolving movement of the planet gear about the main axis.

In a 1 to 1 torque ratio condition, the fluid drive is effective to cause both of the main gears to turn substantially in unison, so that the planet gear and carrier revolve therewith. When greater torque ratios are desired, the fluid transmission commences to slip, to allow the planet gear to revolve rearwardly relative to the drive gear, and thus turn the output shaft at a reduced speed but increased torque. This slip may be inherent in the apparatus as a result of the increased load, or may be controlled in any suitable manner, as by variation of the amount of fluid in the transmission. A maximum torque may be attained when the driven half of the fluid transmission is not turning at all, and the apparatus may if desired be positively locked in this condition by a brake acting to hold that half against rotation.

The above and other features and objects of the present invention will be better understood from the following detailed description of the typical embodiments illustrated in the accompanying drawing in which:

Fig. 1 is a sectional view taken axially through a transmission constructed in accordance with the invention;

Fig. 2 is a fragmentary exploded perspective view of the fluid coupling in Fig. 1;

Fig. 3 is an enlarged fragmentary section taken on line 3—3 of Fig. 1; and

Fig. 4 is a fragmentary view of a variational form of the invention.

Referring first to Figs. 1 and 2, the transmission 10 shown in those figures includes a main housing 11 having a power input shaft 12 extending into one of its ends, and an aligned power output shaft 13 projecting from its opposite end. The input shaft 12 may be rotatably driven by a suitable variable speed, power operated engine or motor 15, typically an automobile internal combustion engine, while the output shaft 13 operates any suitable driven mechanism, as for instance the rear wheels 16 of a vehicle. The internal operating parts of the transmission include a planetary gear assembly 17, a fluid coupling 18, a control brake 19, and a scoop tube 20 and pump 21 for controlling the amount of hydraulic fluid contained in coupling 18.

Housing 11 is rigid and may be attached rigidly to a non-rotating support structure 22. The housing is preferably annular and centered about the main axis 23 of the transmission. A body of hydraulic fluid 24 is contained in the housing, and is confined against escape from the housing by forming the latter to be fluid tight, and sealing it against leakage at all of the various points where parts extend through the wall of the housing to its exterior. The two shafts 12 and 13 are journalled for rotation about their common axis 23 by a pair of bearings 25 and 26 carried by the housing within the tubular portions 27 and 28 through which the shafts extend from the exterior to the interior of the housing. Seal rings 29 and 30 form fluid tight seals preventing fluid leakage between the inside and outside of the housing at the shaft locations.

The planetary gear assembly 17 includes a sun gear 31 rigidly attached to and driven by input shaft 12, several planet gears 32 (typically 3, 4 or 5 such gears), and an outer ring gear 33. The sun gear has external teeth centered about axis 23 and meshing with the teeth of planet gears 32, and the ring gear has internal teeth centered about axis 23 and meshing with the planets. The planet gears are mounted by individual stub shafts 34 and roller bearings 35 for rotation about evenly circularly spaced revolving axes 36 extending parallel to axis 23. The shafts 34 are carried by an annular rigid planet carrier 37, which is rigidly attached to and drives output shaft 13 in accordance with the revolving movement of the planets about axis 23. To assist bearings 25 and 26 in assuring proper alignment of shafts 12 and 13, an additional bearing 38 may be carried within recess 39 in planet carrier 37, to journal the inner end of shaft 12 for rotation relative to carrier 37 and shaft 13. Outer ring gear 33 is mounted for rotation relative to both of the shafts 12 and 13, and is held against axial movement, by a thrust bearing 40 disposed between carrier 37 and an annular radially extending flange 41 formed integrally with gear 33.

In the device of Figs. 1 and 2, the fluid transmission 18 is of the type commonly referred to as a "hydraulic coupling" or "fluid drive." Specifically, this device includes a hydraulic pump half 42 and an axially opposed turbine or "runner" half 43. These two halves may be of essentially the same shape, containing inner cavities 44 and 45 each shaped essentially in the form of a half torus, so that together the halves form essentially a complete torus internally. As is conventional in such hydraulic couplings, the inner half-toroidal cavities 44 and 45 are each interrupted by a series of semi-circular transverse walls or partitions 46 or 47, which lie in circularly spaced planes which may be defined as extending radially of axis 23 and intersecting along and containing that axis. The inner edges 48 and 49 of partitions 46 and 47 extend radially of axis 23 and in closely spaced relation.

The pump half 42 of coupling 18 is rigidly attached to shaft 12 by means of a radially extending flange 50 carried by the shaft. The turbine or driven half 43 of the coupling is rigidly attached to or integral with ring gear 33 and its mounting flange 41. The hydraulic fluid 24 is fed into the radially inner portion of pump section 42 through one or more passages 51 formed in flange 50, which passages receive fluid from an axial passage 52 in shaft 12. A pump 21, mounted stationarily to a support 54 attached to housing 11, and driven by shaft 12 through a pair of gears 153 and 253, takes suction through an inlet line 55 from the body of hydraulic fluid 24 in the bottom of the housing, and discharges fluid under pressure to a swivel fitting 156 which is disposed about shaft 12 and feeds fluid into passage 52 in the shaft. The flow of fluid from pump 21 to fitting 156 may be started and stopped while shaft 12 continues to turn, by means of a valve represented at 154, which is manually or otherwise actuable by a suitable control handle 254 at the outside of housing 11 (with valve control shaft 354 being sealed at 355 as it extends through the housing wall). When valve 154 is in a condition to close off fluid flow from the pump to swivel fitting 156, the valve may function to bypass the pump discharge through a line 68 back into the body of liquid in the bottom of the housing.

In addition to the two sections 42 and 43, the hydraulic coupling 18 includes an annular rigid part 56, which is attached in fluid tight relation to section 43 by a pair of flanges 56 on these parts secured together by circularly spaced bolts 58. Part 56 extends first axially and then radially from flanges 57 to an annular edge 59, to form an annular cavity 60 into which hydraulic fluid from within sections 42 and 43 may flow through the annular space 61 formed between the outer edges of these parts. When parts 42, 43 and 56 are turning, fluid is centrifugally held radially outwardly against their outer walls with the amount of such fluid being controlled by scoop tube 20. This tube has an open pick-up end 62 directed essentially circularly about axis 23, and in a direction to have fluid swept thereinto by the revolving movement of the coupling parts and fluid. From end 62, the fluid flows through the interior of tube 20 to its discharge end 63, from which the fluid escapes into the main body of fluid at the out side of the revolving coupling parts. Tube 20 has a capacity sufficient to at all times scoop all of the fluid from within part 56 down to the level of open end 62 of the tube, so that the level of fluid in part 56 and therefore parts 42 and 43 is controllable by bodily vertical or radial movement of the scoop tube. More particularly, the tube is mounted to support 54 by a sliding connection 64 for sliding movement radially of axis 23. Such movement of part 20 is effected by means of a control rod 65 which extends and is slidable through a sealed bushing 66 in the wall of housing 11, and which may typically have an external actuating handle 67.

Brake 19 may include any conventional type of brake element typically represented at 68, which element is represented as being frictionally engageable with a layer of friction material 168 bonded to a drum 69 attached to part 56. Drum 69 and material 168 are of course centered about axis 23. Brake element 68 is actuable against material 168 by an axially movable actuating rod 70, extending through a sealed opening 71, and actuable by any suitable type of external control mechanism such as a pedal 72 in Fig. 1.

In discussing the operation of the Figs. 1–3 device, assume first the condition in which brake 19 is actuated to frictionally hold drum 69 and the associated parts 56 and 43, and therefore gear 33, against rotation. In this condition, the entire mechanism functions merely as a planetary gear system, in which powered rotation of shaft 12 causes planet gears 32 to revolve about axis 23, and thus drive shaft 13 at a reduced speed and a considerably increased torque as compared with shaft 12. When the brake is thus locked in holding condition, all of the hydraulic fluid may be removed from within coupling sections 42 and 43, to avoid any losses as a result of fluid friction. For this purpose, valve 154 may be set to close off the discharge of fluid from pump 53 to passage 52, and scoop tube 20 may be adjusted to its lowest position to remove all fluid from within parts 42 and 43. The torque ratio between shafts 13 and 12 is relatively high when brake 19 is in holding condition. This condition may be utilized as a high torque starting condition where the transmission is used as an automobile transmission.

When it is desired to reduce the torque ratio, brake 19 may be released, and fluid 24 may be admitted from pump 53 past valve 154 and through passages 52 and 51 into coupling sections 42 and 43, with scoop tube 20 being adjusted to allow the maintenance of a controllable quantity of fluid in sections 42 and 43. In accordance with the well understood principle of operation of fluid couplings, fluid flows radially outwardly by centrifugal force within the various compartments in section 42, and then returns radially inwardly within the compartments of section 43, as indicated by the arrows in Fig. 1. This fluid circulation tends to drive section 43 and thus gear 33 in the same direction that section 42 and gear 31 are turning. As parts 56, 43 and 33 commence to move in that direction, the effective torque ratio between shafts 13 and 12 progressively decreases, until ultimately the gear 33, and therefore gears 32 and shaft 13, are turning almost exactly in unison with section 42 and gear 31. In this condition, the torque ratio between the two shafts is substantially 1 to 1.

Assuming now that the apparatus has reached this 1 to 1 torque ratio condition, it will be apparent that if an increased load is applied to shaft 13, the section 43 and gear 33 will tend to slip relative to section 42 and gear 31, and this slippage will automatically function to increase the torque ratio to satisfy the increased load condition. Thus, the apparatus becomes an automatically responding torque converter. Further, the torque ratio can if necessary be additionally regulated by positive control of the amount of fluid in sections 42 and 43, to attain any desired intermediate condition between the completely filled and completely empty conditions. This regulation is of course effected by control of scoop tube 20 and valve 154 in the manner previously discussed. Thus, the various different controls of the apparatus, and its automatic response characteristics, coact to allow for maximum versatility of operation without the necessity for the usual mechanical complexities.

Fig. 4 illustrates a variational form of the invention which is basically very similar to that of Figs. 1–3, except as to the construction of the fluid transmission portion 18a of the device. Specifically, this fluid transmission of Fig. 4 is adapted to function as either a torque converter or a hydraulic coupling, rather than just the latter. This torque converter includes the usual pump section 42a, turbine section 43a, and stator section 73. These sections may be of any conventional construction, having the usual fluid directing blades, and with the blades of the pump and turbine sections being contained within and carried by annular imperforate outer walls 74 and 75. The pump section 42a is rigidly attached to the input shaft 12a by an annular imperforate member 76 which extends about the shaft and is rigidly attached in annularly fluid tight relation to parts 42a and 12a.

As in the first form of the invention, the Fig. 4 device includes a sun gear 31a attached to input shaft 12a, a plurality of planet gears 32a rotatably mounted to a carrier member 37a which is attached to output shaft 13a, and a ring gear 33a attached to turbine section 43a of the torque converter. The ring gear 33a and section 43a are rotatably journalled about aligned shafts 12a and 13a by a pair of sealed fluid tight bearings 77 and 78 which are contained within annular imperforate walls extending inwardly to the shafts at opposite sides of the gears, and which bearings hold the section 43a against axial movement relative to the shafts.

Section 43 is mounted about shaft 13a in a fixed axial position, but for relative rotation, by a tubular portion 79 of section 73, which tubular portion contains a suitable thrust and centering type sealed fluid tight bearing (not shown). Shafts 12a and 13a are rotatably mounted in axial alignment by a pair of bearings 25a and 26a, whose outer stationary races are mounted to a common stationary support structure 11a. A brake shoe or element 80 is actuable toward and away from engagement with an annular external surface 81 of friction material on element 79, to lock section 73 against rotation when desired. Shoe 80 may be carried by an arm 82 which is diagrammatically represented as being pivoted to the outer stationary race of bearing 26a, and which may be actuated in brake applying and releasing directions by an operating mechanism represented at 83. The inner annular edge of section 42a of the pump section of the torque converter is rotatably mounted about shaft 13a by a fluid tight sealed bearing 84.

When brake 80 is in holding condition, and section 73 is therefore stationary, device 18a functions as a torque converter. When the brake is released, device 18a functions as a fluid drive or hydraulic coupling of the Fig. 1 type, with section 73 turning freely with sections 42a and 43a. In either case, the gears coact with the fluid transmission in essentially the same manner as in Fig. 1, to multiply the torque of the driven or output shaft 13a as compared with the drive or input shaft 12a, whenever there is slippage between pump section 42a and turbine section 43a. In torque converter condition, however, the overall torque multiplication is greater than in the hydraulic coupling condition, since the inherent torque multiplication of the converter is added to the torque multiplication attained by the basic relationship between the gears and fluid transmission, to thus maximize the peak torque ratio attainable.

Fig. 4 has typically been represented as a device in which the hydraulic fluid is at all times contained in the torque converter, and in which that fluid is retained against leakage only by the outer imperforate walls of the rotating section 42a itself (and associated seals) without the necessity for an additional outer stationary housing. Also, sufficient lubricant is of course maintained in the inner gear case portion of the device to effectively lubricate the gears.

I claim:

1. A transmission comprising a first gear adapted to be rotatably driven about an axis, a second gear mounted to turn about said axis, a planet gear meshing with both of said first two gears and adapted to rotate about an axis which revolves about said first axis, a power output member adapted to be rotatably driven about said first axis by the revolving movement of said planet gear, and a fluid drive connection between said first and second gears tending to turn the latter about said first axis as a result of rotation of the former thereabout, said fluid connection including a pump section connected to said first gear for rotation therewith and a turbine section connected to said second gear for rotation therewith, said two sections being located opposite one another in proximate closely coupled relation and in contact with a common body of liquid so that rotation of the pump section tends to correspondingly rotate said turbine section, and a multiple setting liquid regulating control operable to regulate the amount of liquid in said sections and adapted to be adjusted to, and remain for a substantial period in, any of a series of different settings including a maximum fill setting, a minimum fill setting and a plurality of intermediate settings in which said sections are only partially filled with liquid, whereby in said maximum fill setting power is transmitted directly through said fluid connection at a 1 to 1 speed ratio, and in said partially filled settings power is transmitted in part through said fluid connection and in part through said gears, in controllable proportions, to vary the overall speed ratio of the transmission.

2. A transmission as recited in claim 1, in which said liquid regulating control is adapted to be adjusted to and remain for a substantial interval in, any of an infinite number of settings between said maximum fill and minimum fill settings.

3. A transmission as recited in claim 1, in which said liquid regulating control includes a scoop tube adapted to be adjusted to, and remain for a substantial interval in, said maximum fill setting, said minimum fill setting, and any of said intermediate settings.

4. A transmission as recited in claim 1, in which said liquid regulating control includes a pump for filling liquid into said sections, and a scoop tube for withdrawing liquid from the sections and adapted to be adjusted to, and remain for a substantial period in, said maximum fill setting, said minimum fill setting, and any of said intermediate settings.

5. A transmission as recited in claim 4, in which said scoop tube is adapted to be adjusted to, and remain for a substantial period in, any of an infinite number of settings between said maximum fill and minimum fill settings.

6. A transmission as recited in claim 1, in which said first gear is a sun gear and said second gear is a ring gear of greater diameter than the sun gear.

7. A transmission as recited in claim 1, in which said power output member is a planet carrier mounted to turn about said first axis and carrying said planet gear for relative rotation about said second revolving axis.

8. A transmission as recited in claim 1, including additional means for holding said second gear against rotation about said first axis.

9. A transmission as recited in claim 1, including a brake for mechanically and releasably locking said second gear against rotation about said first axis.

10. A transmission as recited in claim 9, in which said first gear is a sun gear and said second gear is a larger diameter ring gear, said power output member being a planet carrier mounted to turn about said first axis and carrying said planet gear for relative rotation about said second revolving axis.

11. A transmission as recited in claim 10, in which said liquid regulating control includes a pump for filling liquid into said sections, and a scoop tube for withdrawing liquid from the sections and adapted to be adjusted to, and remain for a substantial period in, said maximum fill setting, said minimum fill setting, and any of said intermediate settings.

12. A transmission as recited in claim 11, in which said scoop tube is adapted to be adjusted to, and remain for a substantial period in, any of an infinite number of settings between said maximum fill and minimum fill settings.

References Cited in the file of this patent

UNITED STATES PATENTS

| | | |
|---|---|---|
| 2,303,829 | Dodge | Dec. 1, 1942 |
| 2,561,499 | Cohen | July 24, 1951 |

FOREIGN PATENTS

| | | |
|---|---|---|
| 1,090,082 | France | Oct. 13, 1954 |